Sept. 28, 1965     G. GRIEVES ETAL     3,209,111
ILLUMINATED PUSH-BUTTON-TYPE ELECTRIC SWITCHES
Filed July 2, 1963     2 Sheets-Sheet 1
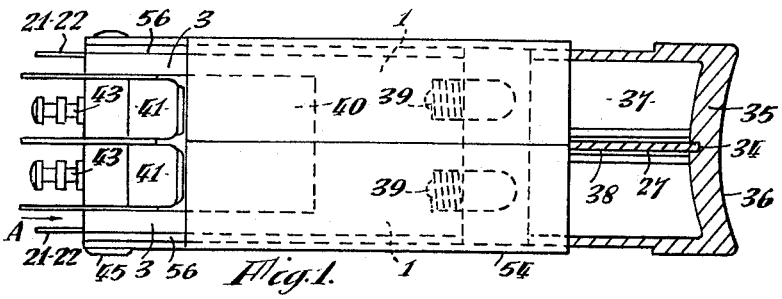
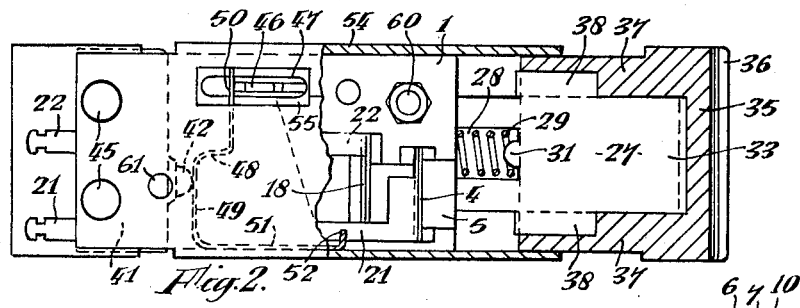
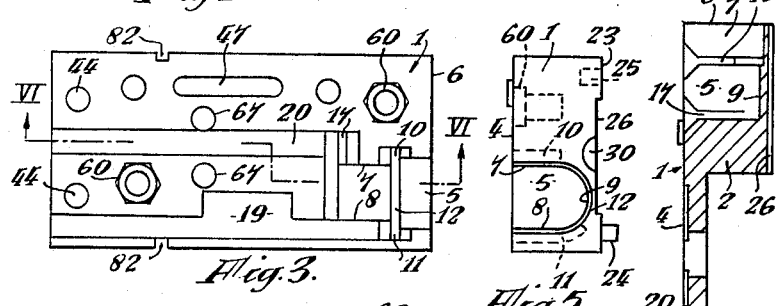
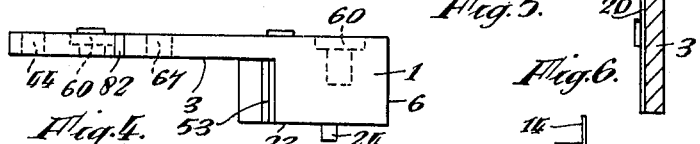
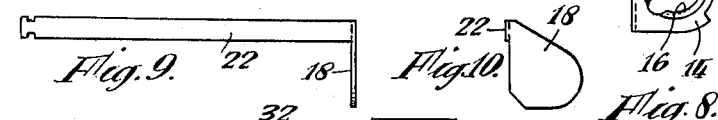
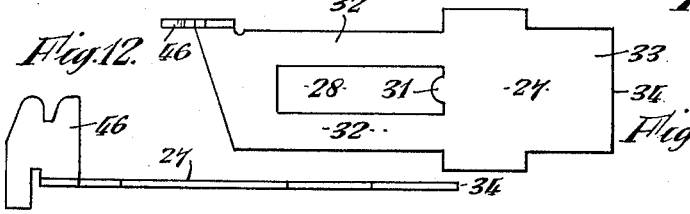
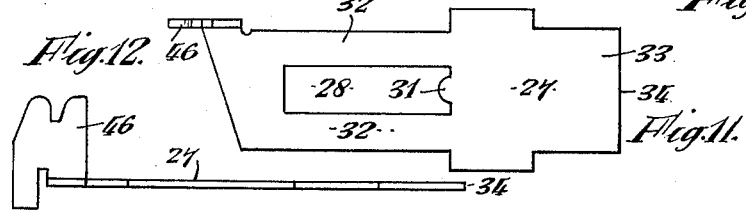

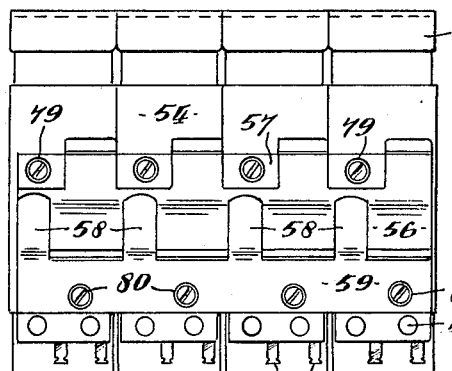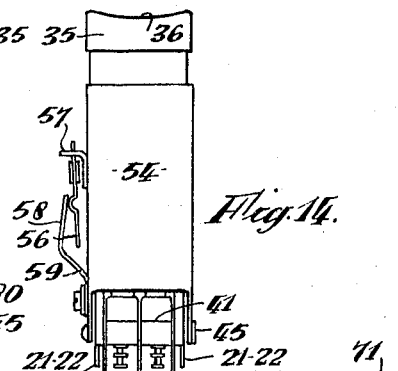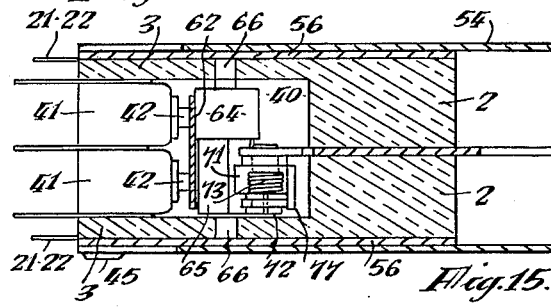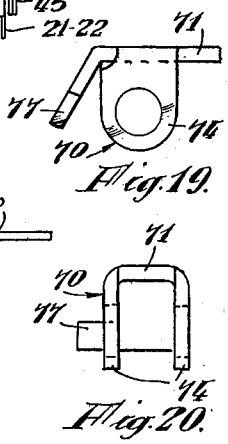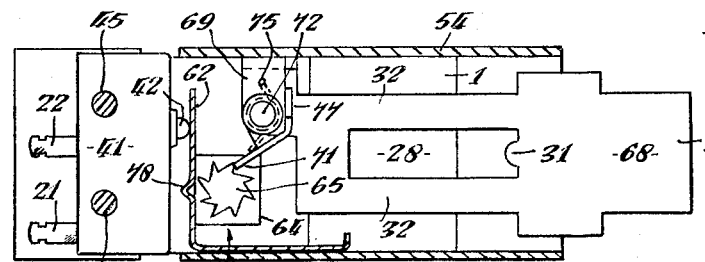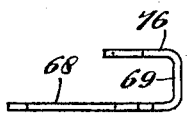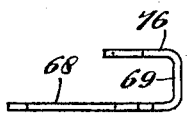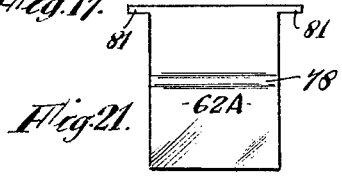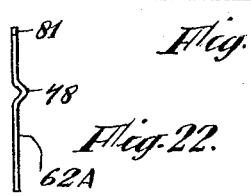

United States Patent Office 3,209,111
Patented Sept. 28, 1965

3,209,111
ILLUMINATED PUSH-BUTTON-TYPE
ELECTRIC SWITCHES
Gordon Grieves and Brian Astbury Holden, Newcastle upon Tyne, England, assignors to Burgess Products Company Limited, Hinckley, England, a British company
Filed July 2, 1963, Ser. No. 292,386
7 Claims. (Cl. 200—167)

This invention relates to electric switches of the illuminated push-button type and has for objects to provide improvements facilitating manufacture and assembly, access for replacement of a failed light bulb or other component, and installation particularly where a plurality of such switches are to be mounted in close relationship in a rank or group.

A switch of the illuminated push-button type has been proposed wherein switch means are mounted at one end of a housing with a push-button at the other end of said housing and a light bulb holder supported by the housing to locate a lamp bulb within an inwardly extending skirt on the push-button, so that inter alia the light bulb is renewable upon removal of the push-button, but although the switch according to the invention has this arrangement of the recited components, it differs from the said proposal in various respects as hereinafter stated.

We provide an electric switch of the illuminated push-button type, having a body which supports switch means at its inner end, a member slidable longitudinally and protruding from the outer end of the body, and a push-button removably mounted on the protruding end of said slidable member, said body having at its outer end at least one recess wherein are located a socket member to receive a light bulb and a second contact member to be engaged by the cap end terminal of said light bulb, said socket and contact members having each an inward extension to or beyond the switch means, the ends of said extensions serving as terminals adjacent the external terminals of the switch means for connection of the light bulb in circuit with said switch means.

The push-button may have transversely an outline which coincides with or is within the transverse sectional outline of the body, so that the switch with the push-button in place on said slidable member can be mounted in or removed from an aperture of corresponding outline in a panel from the rear of said panel.

A switch according to the invention may have a mounting for a single light bulb on the longitudinal axis of its body (said "axis" including the axis of a cylinder to which the sides of a body of polygonal section are tangential), said slidable member being bifurcated or slotted and having two limbs extending longitudinally one on each side of said socket member. Alternatively, the switch may have two socket members for light bulbs on opposite sides of a slidable member located on said axis, or a slidable member of plate-like form disposed in a diametrical plane of said axis.

Regardless of the form of the slidable member, the switch body may advantageously be formed of two parts which may be identical, adapted to be secured together so as to provide a guide way for said slidable member and a space within which are mounted switch means and actuator means for transmitting displacement of said slidable member to the switch plunger means. Means for securing the two parts of the body together may include bolts which also serve to locate the switch means; the latter may, for example, be at least one or a plurality of the small switches enclosed within block-like bodies, of the kind known as microswitches, which are mounted by means of bolts passed through holes in the blocks, and such bolts may also be passed through corresponding holes in portions of the two parts of the switch body for securing said parts together and also the switch block or blocks between them.

Two embodiments of electric switches according to the invention will be described by way of example, and in order that the invention may be better understood, with reference to the accompanying drawings, wherein:

FIG. 1 is a side view of a switch, showing its push-button in section, and

FIG. 2 is a plan view, with a casing partly broken away and showing said push-button in transverse section;

FIG. 3 is a plan view of a body part;

FIGS. 4 and 5 are side and outer end elevations respectively of the same, and

FIG. 6 is a section on the line VI—VI of FIG. 3;

FIGS. 7 and 8 are side and end views of a lamp socket element, and

FIGS. 9 and 10 are similar views of a contact element;

FIGS. 11 and 12 are a plan and a side elevation of a slidable element;

FIG. 13 is a plan view and FIG. 14 is a side elevation, of a group of switches;

FIGS. 15 and 16 are views (corresponding to FIGS. 1 and 2) of a modified, push-on, push-off switch, FIGS. 17 and 18 are side and end views of a modified slidable element;

FIGS. 19 and 20 are side and end views on a larger scale of a pawl, and

FIGS. 21 and 22 are respectively a plan view and a side view of a further modified actuator element.

In the embodiment illustrated in FIGS. 1–12 of the drawings, the body comprises two identical parts 1 (see FIGS. 3–6) which may be moulded in plastic material having electrical insulating properties. Each part comprises a cuboid portion 2 at its outer end and a wall 3 extending in the plane of one side 4 of said cuboid portion (which for convenience will be referred to as "the shoulder"). In one half of the lateral surface of said shoulder 2, of which the wall 3 presents a continuation, there is a deep lateral recess 5 also open to the outer transverse surface 6 of the shoulder (i.e., the transverse surface opposite that from which said wall extends). Considering said outer transverse surface 6, for convenience of description, as being located in a vertical plane, with said wall 3 in a horizontal plane perpendicular thereto (as seen in FIGS. 1 and 4) the lateral surfaces 7, 8 of the recess, which are vertical, and also the base surface 9, which may be hemi-cylindrical, are also perpendicular to said transverse surface 6. The surfaces 7, 8, 9 of the recess have formed in them, somewhat nearer said outer transverse surface, grooves 10, 11, 12 adapted to receive edgewise a laminar plate element 14 as shown in FIGS. 7 and 8. The middle of said element 14 is formed with an aperture 15 and a surrounding interrupted helical formation 16 to serve as a socket for a small light bulb. Further there is formed in the wall 7 of the recess a groove 17 adapted to receive an edge of a plate-like contact element 18 (FIGS. 9 and 10) so as to locate this element against the inner end surface of the recess 5. Extending longitudinally from these transverse grooves, throughout the length of the adjacent wall 3, are two shallow recesses 19, 20 to accommodate laminar tail strips, one strip 21 integral with the socket element 14, and located adjacent the lateral edge of the wall 3, and the other integral with said contact element 18 and located substantially at the middle of the wall 3. This arrangement of elements 14, 18 and tail strips 21, 22 thereon provides a mounting into which the light bulb can be inserted or removed from the outer end or front of the body part, and the two strips 21, 22 serve for the inclusion of said light bulb in an electric circuit, the inner ends of the strips as shown in FIGS. 1 and 2 acting as terminals for this purpose at the inner end of the body part.

To form the body, two such parts 1 are secured together with the surfaces 23 of their shoulders in mutual abutment. Each of these abutting surfaces 23 has, for mutual location, a spigot 24 and a recess 25, the spigot of one part entering the recess in the other part. Each of the surfaces 23 also has a shallow recess 26, and the two opposed recesses provide a narrow slot which serves as a guide for a laminar slidable element 27 (FIGS. 11 and 12). This element has a longitudinal slot 28 in which is disposed a compression coil spring 29, each of said two opposed recesses 26 having at its middle a longitudinal, part-cylindrical groove 30 and these grooves co-operating to provide a blind hole for housing the spring, the outer end of which is located on a lug 31 at the outer end of the slot 28, between the two limbs 32 which are formed by the slot. At its outer end said member 27 has a rectangular portion 33 with an outer edge 34 which as seen in FIG. 1 is also horizontal. Upon this outer portion is located a thumb-button 35 which is integrally moulded to provide a rectangular, concave outer surface 36 and four inwardly extending walls, two of the walls 37 presenting internally opposed channels 38 formed to slide over the lateral edges of said outer rectangular portion 33 of the slidable member, so as to locate said thumb-button 35 removably thereon. Since in the operation of the switch the only force applicable to said thumb-button is a pressure to move it in the inward direction (movement in the outward direction being effected by the spring 29), this mode of mounting the thumb-button affords ample security so long as the channels 38 therein have a reasonably tight fit on the edges afforded by the slidable member. When it is desired to remove the thumb-button this can easily be done by gripping it and pulling it away from the switch body. In frontal aspect, the rectangular thumb-button has the same outline as the transverse section of the switch body afforded by its two co-operating parts 1.

By the arrangement of the recess 5 for a light bulb 39 in each part, and the fact that the two parts have their shoulders 2 butted together in left- and right-handed relationship, the arrangement is such that the two light bulbs are located each towards one of diagonally opposite corners of the switch body, from which the light bulbs partly project outwardly into the hollow interior of the thumb button 35. The latter is of course made of a material which is at least partly translucent, so that when the bulbs or either of them are lit the illumination is visible through the material of the thumb-button. If in certain circumstances separate illumination of one or other of the light bulbs is of significance, to indicate a particular state of an associated circuit, reading of the signals afforded is facilitated by the fact that the two light bulbs are separated and screened from one another by the rectangular outer portions of the plate-like slidable member, which may be made of opaque material (e.g. sheet metal) so that in effect each light bulb is located within one of two separate chambers within the translucent thumb-button.

It will be appreciated that the light bulbs 39 are accessible from the outer end of the assembly, after removal of the thumb-button 35, regardless of the mode of mounting of the switch (e.g. in any of the modes hereinafter to be described) in an aperture in a panel, with the body behind the panel and the thumb-button exposed at the front thereof. The light bulbs, which are very small (having e.g. a diameter of about 4 mm. in a switch body which is about 18 mm. square in transverse section) are removable and insertable in known manner with the aid of suitable tweezers, the limbs of which have concave ends to grip the bulb.

In the space 40 within the body formed by the parallel walls 3 of the two body parts there are located, at the inner or open end of said recess, two small micro-switches 41 with their plungers 42 directed into said space and their terminal elements 43 (FIG. 1) extending in the opposite sense. Each of these micro-switches is comprised in a block of long rectangular transverse section, and through each block across the narrow dimension there extend a pair of holes. Each of the two walls 3 has towards its inner end a registering pair of holes 44, and two rivets 45 are passed through the assembly of two walls and two switch blocks so as to secure the walls and thus the body parts together, with the switch blocks firmly mounted between them.

The inner end aspect A (FIG. 1) of the switch body thus assembled presents the terminals 43 of the two switch blocks arranged in a group between the ends of the two walls 3 of the body parts, and on the outer surface of each wall a pair of ends of the strips 21, 22 extending from the socket and contact elements of each light bulb mounting. Thus all the contacts for connection of the switches and the light bulbs into a circuit or circuits are presented at the inner end of the body, which is advantageous, particularly if it is desired to connect the switch assembly with its light bulbs into printed circuitry.

In the remaining part of the space 40 there is located the inner end of the slidable member, which is a lug 46 extending into a longitudinal slot 47 in the upper one of the walls 3 (FIGS. 2 and 3). Said lug is formed to co-operate with a resilient or pivoted latch member mounted outside the switch body, to serve as a lock for holding the slidable member in its inwardly displaced position (in a manner known in itself) when pressure is applied to the thumb-button. Further there is mounted in said space 40, between said inner end of the slidable member 27 and the plungers 42 of the switches, an actuator element 48 (FIG. 2) formed as shown, of resilient laminar strip, with a portion 49 to bear upon the switch plungers and a limb 50 bent to maintain continuous contact with the lug 46 of the slidable member. This actuator element is integral with and extends from a plate portion 51 which lies at one open side of the space 40, the outer end of said plate portion having a transverse flange 52 which is located in a transverse groove formed by registering coplanar groove parts 53 (FIG. 4) each in the lateral surface of one of the two shoulder portions of the body parts. The actuator element 48 serves as a resilient lost-motion device interposed between the slidable member 27 and the switch plungers 42, so that inward motion of the slidable member may continue after the switch plungers have been depressed to the limit of their movement.

For the mounting of a switch assembly as above described on a panel, various means may be employed. So that the assembly may be mounted on the rear surface of a panel, with no more than the thumb-button or part thereof projecting from the front surface, a pair of L-form brackets may be attached to said walls 3 of the body parts. Alternatively, as shown in FIGS. 1 and 2, the assembly may be housed in a tubular casing 54 of equivalent square section. If required, laminar insulation strips 56 may be located between the current lead strips 21, 22 of the light bulb contacts and said brackets or the contiguous walls of the casing 54.

The appropriate wall of casing 54 has a slot 55 to register with the slot 47 in the wall 3 of the body part into which said lug 46 on the slidable member projects, to enable an externally mounted latch member to co-operate with said lug. The arrangement of the brackets or casings permits a series of assemblies to be grouped closely together in a rank as shown in FIGS. 13 and 14, and a single latch member 56 may be mounted upon a bracket 57 and borne upon by resilient tongues 58 of an element 59 to co-operate with the plurality of the switch assemblies, in known manner, the release of the latch member 56 being effected by operation of any one of the group of switch thumb-buttons, or by a separate push-button provided to effect the simultaneous release of the group of switches.

In order to secure said brackets or said casing 54 to a switch body, each of said walls 3 on the body parts may have at least one suitably located hexagonal recess, with a co-axial hole, a bracket or a wall of a casing having a hole adapted to register therewith. For securing a bracket, said hexagonal recess may be in the inner surface of said wall and so located that a nut can be held therein, for example, by a switch block abutting said surface, so that a suitable screw inserted through the registering holes in the bracket and said wall can be tightened into said nut to secure the bracket. When the assembly is secured in a tubular casing as shown in FIGS. 1 and 2, said hexagonal recesses 60 (FIGS. 3 and 4) are in the outer surfaces of the walls 3, so that nuts located therein and secured by the overlying casing walls may serve as anchorages for suitable screws inserted from the exterior through a hole 61 to secure mounting means for the switch assembly, or attachments to the casing.

For example, FIGS. 13 and 14 show the bracket 57 secured to the rank of switch casings by screws 79 engaging nuts located in those of the recesses 60 which are nearer the thumb-button ends of the casings, and the element 59 secured by screws 80 engaging nuts located in the recesses 60 adjacent the switch blocks 41.

A switch as hereinbefore described may be modified for alternate switching on and off by successive pushes on the thumb-button, as shown in FIGS. 15–22. In such a push-on, push-off switch, the actuator is a plate element 62 maintained in contact with the plungers by a ratchet rotor 63 having a square portion 64 bearing on said element 62. Beside said square portion, the rotor has an eight-tooth ratchet portion 65. The rotor is mounted by trunnions 66 in a pair of opposed holes 67 in said walls 3 (FIG. 3) (which holes in the switch previously described are unoccupied). The inner end of a modified slidable member 68 as shown in FIGS. 17 and 18 is provided with a stirrup 69 in which is mounted a pawl 70. This pawl is a pressing as shown in FIGS. 19 and 20, having a nose 71 directed to engage said ratchet teeth. The pawl is mounted on a pin 72 riveted in the stirrup 69, and is engaged by a torsion spring 73 also mounted on said pin between lugs 74 of the pawl. One end of said spring is located in a hole 75 in the outer limb 76 of said stirrup 69, and the other end bears on the pawl nose 71. The pawl also has an integral stop 77 which bears on said limb 76 to limit the projection of the nose 71.

There are two holes 67 in each of the body parts 1, so that these while being identical mouldings will when butted together provide an offset coaxial pair of holes for the trunnions 66 of the ratchet motor.

The arrangement is such that each time the thumb-button is pushed the rotor 63 is turned through 45° by the pawl nose 71. Thereby, when said square portion engages the actuator element 62 by its corners entering a notch 78 therein, the switch plungers 42 are depressed, and when said square portion engages said element 62 by its flat faces the plungers are allowed to protrude. The rotor is held stable in either operated position by its engagement with the actuator 62. When the thumb-botton is released after operation of the ratchet rotor, upon the outward displacement of the slidable member 68 by its associated spring 29, the pawl spring 73 allows said nose 71 to ride back over the next ratchet tooth without turning the rotor, so that said next tooth is in the path of said nose in readiness for the next operation of the thumb-button.

FIGS. 21 and 22 show a modified actuator element 62A which may be employed in place of the resilient element 62 shown in FIGS. 15 and 16. The element 62A is a rectangular plate, also having a notch 78, and provided at two corners with a pair of lugs 81 which may be pivotally located in recesses 82 in the sides of the wall 3, FIGS. 3 and 4. Said element 62A lies between the switch plungers 42 and the ratchet rotor 63, and is held within the space 40 by the casing 54.

A switch assembly according to the invention and as hereinbefore more particularly described evidently affords advantages in production, since its body may comprise two identical halves easily formed by moulding in plastic material to comprise accommodation for at least one light bulb, a mounting for the microswitch(es) and mounting and guide means for the switch operating mechanism. Further, a thumb-button moulded in plastic material may be a simple push-fit on the slidable member, being thereby securely mounted yet easily removable at will.

The assembly is further adapted for simple connection of the switch contacts and light bulb leads into printed circuitry. Also the provision of two light bulbs affords an advantage in signalling, for example, the bulbs being connected into separate circuits or parts of a circuit so that the illumination of one of the bulbs indicates that the switch has been operated and is latched on, while illumination of the other can indicate that an operation thereby controlled, for example through relay means, has been effectively performed.

We claim:

1. An electric switch of the illuminated push-button type, having a static body, switch means supported at the inner end of said body, a member slidable longitudinally through and protruding from the outer end of the body, an actuator member mounted in said body to be displaceable by inward sliding of said slidable member, at least one plunger of said switch means resiliently in contact with said actuator member, and a push-button removably mounted on the protruding end of said slidable member, said body having at its outer end at least one recess wherein are located a socket member to receive a light bulb and a separate second contact member to be engaged by the cap end terminal of said light bulb, said socket and contact members having each an integral inward extension beyond the switch means, the ends of said extensions serving as terminals adjacent the external terminals of the switch means for connection of the light bulb in circuit with said switch means.

2. An electric switch according to claim 1 having a mounting for a single light bulb on the longitudinal axis of said body, said slidable member being slotted and having two limbs extending longitudinally one on each side of said socket member.

3. An electric switch according to claim 1 wherein said slidable member is of plate-like form and disposed in a diametrical plane of said axis, and the body has two recesses, two socket members and two contact members for light bulbs on opposite sides of said slidable member.

4. An electric switch according to claim 1, wherein said recess is also open to the side of the body, and has one transverse groove to receive a plate portion of said socket member perpendicular to the integral inward extension thereof and another transverse groove to receive a plate portion of said contact member perpendicular to the integral inward extension thereof, said inward extensions lying parallel to each other against the side of the body.

5. An electric switch according to claim 1, wherein the body is formed of two parts secured together and so formed as to provide a guideway for said slidable member and at the inner end of the body a space within which are mounted said switch means and said actuator member.

6. An electric switch according to claim 5, wherein said two parts of the body are identical and secured together in left and right handed relationship, securing means being rivets which also serve to locate the switch means.

7. A switch according to claim 5, further comprising a tubular casing having the same transverse sections as the secured-together parts of the body, and rivets which secure said casing, said body parts and said switch means together in assembly.

References Cited by the Examiner

UNITED STATES PATENTS

| | | | |
|---|---|---|---|
| 2,935,653 | 5/60 | Campe et al. | 200—167 X |
| 2,956,446 | 10/60 | Ensign et al. | 200—167 X |
| 3,118,038 | 1/64 | McKnight | 200—167 |
| 3,153,714 | 10/64 | Bury | 200—167 |
| 3,157,771 | 11/64 | Boeser | 200—167 |

KATHLEEN H. CLAFFY, *Primary Examiner.*

ROBERT K. SCHAEFER, *Primary Examiner.*